United States Patent [19]

Maher

[11] 4,266,265
[45] May 5, 1981

[54] CERAMIC CAPACITOR AND METHOD FOR MAKING THE SAME

[75] Inventor: Galeb H. Maher, North Adams, Mass.

[73] Assignee: Sprague Electric Company, North Adams, Mass.

[21] Appl. No.: 79,686

[22] Filed: Sep. 28, 1979

[51] Int. Cl.³ .................. H01G 4/12; C04B 35/46; C04B 35/64
[52] U.S. Cl. .................. 361/321; 361/320; 65/18; 106/73.31; 264/61; 427/79
[58] Field of Search ............ 361/321, 320; 106/73.3, 106/73.31; 252/63.2, 63.5, 520; 65/18; 427/79; 264/61

[56] References Cited

U.S. PATENT DOCUMENTS

| | | | |
|---|---|---|---|
| 3,279,947 | 10/1966 | Kaiser | 106/73.31 X |
| 3,609,483 | 9/1971 | Smyly | 252/520 X |
| 3,885,941 | 5/1975 | Maher | 65/18 |
| 3,977,887 | 8/1976 | McIntosh | 106/73.31 X |
| 4,027,209 | 5/1977 | Maher | 252/63.2 X |
| 4,066,426 | 1/1978 | Maher | 65/18 |
| 4,089,813 | 5/1978 | Alexander | 252/63.5 X |
| 4,120,677 | 10/1978 | Burn | 106/73.3 X |

OTHER PUBLICATIONS

Glasser et al., "The Preparation and Crystal Data of the Cadmium Silicates $CdSiO_3$, $Cd_2SiO_4$ and $Cd_3SiO_5$," *Organic Chemistry*, vol. 3, No. 9, Sep., 1964, pp. 1228–1230.

*Primary Examiner*—Elliot Goldberg
*Assistant Examiner*—E. F. Borchelt
*Attorney, Agent, or Firm*—Connolly and Hutz

[57] ABSTRACT

High-cadmium silicates, namely $2CdO.SiO_2$, $5CdO.2SiO_2$ and $3CdO.SiO_2$, are employed as the flux in a dielectric ceramic precursor mixture. The characteristic melting temperature of these fluxes is greater than the maximum ceramic firing temperature employed in the present method. Nevertheless, liquid phase sintering is achieved when such cations as the alkaline earth metals or lead from the high firing ceramic precursors diffuses into the flux, displacing some of the cadmium and reducing the melting temperature of the flux below that of the firing temperature. Some of the cadmium from the flux is drawn into the grains to replace the lost barium and lead. Escape of cadmium into the atmosphere is thereby substantially prevented. This method is particularly effective when the dielectric ceramic is a barium lead titanate zirconate and when the amount of the flux is kept very small. Even more particularly, unusually smooth capacitance versus temperature characteristics and high room-temperature dielectric-constants are realized for solid solutions of barium titanate with from 8–15 mole percent lead zirconate.

14 Claims, 4 Drawing Figures

CERAMIC CAPACITOR AND METHOD FOR MAKING THE SAME

BACKGROUND OF THE INVENTION

This invention relates to a low firing barium-lead-titanate capacitor and a method for making that capacitor comprising firing the green ceramic body at a temperature less than the melting temperature of all the start materials, which start materials include a crystalline high-cadmium silicate flux.

It is known to use a low-melting-temperature sintering aid for reducing the temperature at which otherwise high firing ceramic materials such as the alkaline earth titanates will densify and mature. For example, my patent U.S. Pat. No. 3,885,941 issued May 27, 1975, describes the use as a sintering aid of multiple component cadmium-containing glasses having melting temperatures no higher than 875° C. The cadmium and lead oxides in these glasses are highly toxic and volatile so that firing on an open slab leads to loss of these oxides from the sintering ceramic body to the surrounding atmosphere. This results in hazardous work conditions as well as degradation of the ultimate dielectric properties. Controlled atmosphere firing in closed containers is much safer and provides much better dielectric properties with tighter control, as is described in my patent U.S. Pat. No. 4,066,426, issued Jan. 3, 1978.

It is also known to combine and fire lead-lanthanum-titanate-zirconate (PLZT) ceramic powders with a low melting glass as is described in my U.S. Pat. No. 4,027,209 issued May 31, 1977.

All three of the above noted patents are assigned to the same assignee as is the present invention. Sintering aids known heretofore are usually glasses and are always designed to melt at the firing temperature to promote liquid phase sintering.

It is an object of the present invention to provide an efficient method for fluxing and promoting densification of a dielectric ceramic material at low firing temperatures with a minimum reduction in the resulting dielectric constant.

It is a further object of this invention to provide in such a method the use of a cadmium rich flux.

It is yet a further object of this invention to provide such a method capable of execution without the need for completely closed atmospheres and without substantial loss of cadmium to the atmosphere.

It is a further object of this invention to provide a dielectric body having a very high dielectric constant for any one standard class of temperature characteristics.

SUMMARY OF THE INVENTION

The method of this invention provides a capacitor having cadmium-containing dielectric ceramic grains and a very small amount of an intergranular silicate phase. The resulting dielectric ceramic body has a surprisingly high dielectric constant, a relatively smooth TCC characteristic and is capable of being fired to maturity at a low enough temperature to include high-silver-content buried electrodes.

The method of manufacture of this capacitor includes the mixing of precursor powders of a high firing ceramic containing an alkaline-earth-metal plus a cadmium silicate selected from $2CdO.SiO_2$, $5CdO.2SiO_2$ and $3CdO.SiO_2$. All of these ingredients have a high melting temperature, namely greater than 1200° C., unlike in the prior art wherein the fluxing agent is chosen to have a melting temperature less than the firing temperature for promoting liquid phase sintering and for reducing the firing temperature at which densification and grain growth may be achieved. In the present method the precursor powders and cadmium silicate are mixed, a body is formed of the mixture, and the body is fired at a temperature of up to 1150° C. and thus at less than the melting temperature of the flux. The high-temperature-melting start materials of the present invention, i.e. the ceramic precursors and flux, upon being heated combine and initially react with each other through a solid diffusion process to form a low melting eutectic alkaline-earth metal silicate. Subsequently it proceeds through melting to promote liquid phase sintering of the ceramic materials. During the sintering process, cadmium from the cadmium silicate is exchanged with the alkaline-earth-metal in the high firing ceramic. The exchanged cadmium is incorporated as $Cd^{+1}$ cations in the ceramic grains. It is preferred to provide in the start materials aliovalent donor cations such as $Nb^{5+}$, $Ta^{5+}$, $Sb^{5+}$, $W^{6+}$, and $La^{3+}$ (with respect to such crystalline ceramics as $BaTiO_3$ and $PbZrO_3$ having a large cation of charge +2 and a small cation of charge +4).

When too much of the cadmium silicate flux is added to the start materials, the dielectric constant of the fired ceramic is diminished but when too little is used the liquid flux reservoir at sintering is a less efficient sintering promotor (i.e. higher temperature and/or longer sintering time is required). Thus the preferred amount of the glass former, namely silicon, lies between 0.5 and 2.2 atomic percent of all the cations in the body.

A major advantage of the cadmium silicate fluxes of this invention is that they are chemically stable at temperatures less than their high melting temperature. Thus, unlike for the cadmium containing fluxes of the prior art, they lose insubstantial amounts of cadmium and cadmium oxide to the atmosphere at firing. During the entire sintering process the cadmium is associated with either the stable silicate or with the stable high temperature ceramic grains.

The high-firing ceramic constituent is preferably from 92 to 84 mole percent barium titanate and 8 to 15 mole percent lead titanate to obtain combined properties of optimally smooth TCC and high K at room temperature. Neither the Pb nor the Cd should be introduced in the start materials as the oxides or as the elements to avoid loss to the atmosphere of Pb and Cd during firing. The introduction of Pb as $PbTiO_3$, $PbZrO_3$ and $PbSnO_3$ is thus greatly preferred.

Many of the cadmium containing capacitors of this invention are capable of being fired in an open atmosphere, and all of the capacitors of this invention require significantly less control of the atmosphere at firing than do cadmium containing capacitors of the prior art.

DESCRIPTION OF THE PREFERRED EMBODIMENTS

Figure 1:
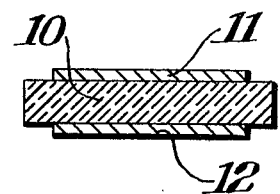
FIG. 1 shows in side sectional view a wafer or disk type ceramic capacitor of this invention.

A number of experimental wafer type capacitors were made and are illustrated in FIG. 1. The wafer bodies 10 were first formed by the conventional steps of combining start ceramic precursor powders and powdered flux, if any, in an organic vehicle and binder medium, milling this slurry mixture to provide homogeneous distribution of the particles in the slurry, casting the slurry by doctor blade technique to form a cast sheet, drying the sheet by heating to 800° C. for about ½ hour and cutting the dried sheet into square wafers having green dimensions of about 1 cm × 1 cm × 0.5 mm thickness. The square wafers were then fired at 1100° C. (unless otherwise noted) in a closed crucible (except where otherwise noted). A silver electroding paste was then applied to the two major faces of each mature ceramic wafer and fired at 800° C. to form two capacitor electrodes 11 and 12 (FIG. 1).

Some experimental monolithic capacitors were made by the following conventional steps. The precursor powders of a high firing alakline-earth-metal ceramic were mixed with cadmium silicate in a vehicle and binder medium of turpentine, 6% pine oil and 5% lecithin. This slurry containing about 70% by weight solids was milled for about six hours.

Figure 2:
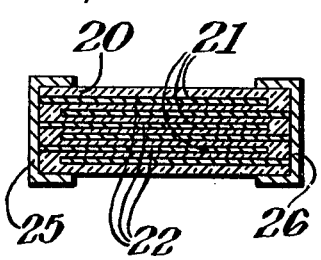
FIG. 2 shows in side sectional view a monolithic ceramic capacitor of this invention.

Successive coatings of the milled slurry were applied over a glass substrate, drying each layer in turn and screen printing an electroding paste of 70% silver and 30% palladium to the cast dried layer. Before applying the next successive dielectric layer, the screened pattern of electroding paste was dried. The body 20, as shown in FIG. 2 with buried electrodes 21 and 22, was cut from the stack and was fired to maturity at 1100° C. for 2½ hours. A silver paste was then applied to either end of body 20 at which edges of the buried electrodes were exposed. The body was fired at 750° C. for a few minutes to form silver terminations 25 and 26.

Figure 3:
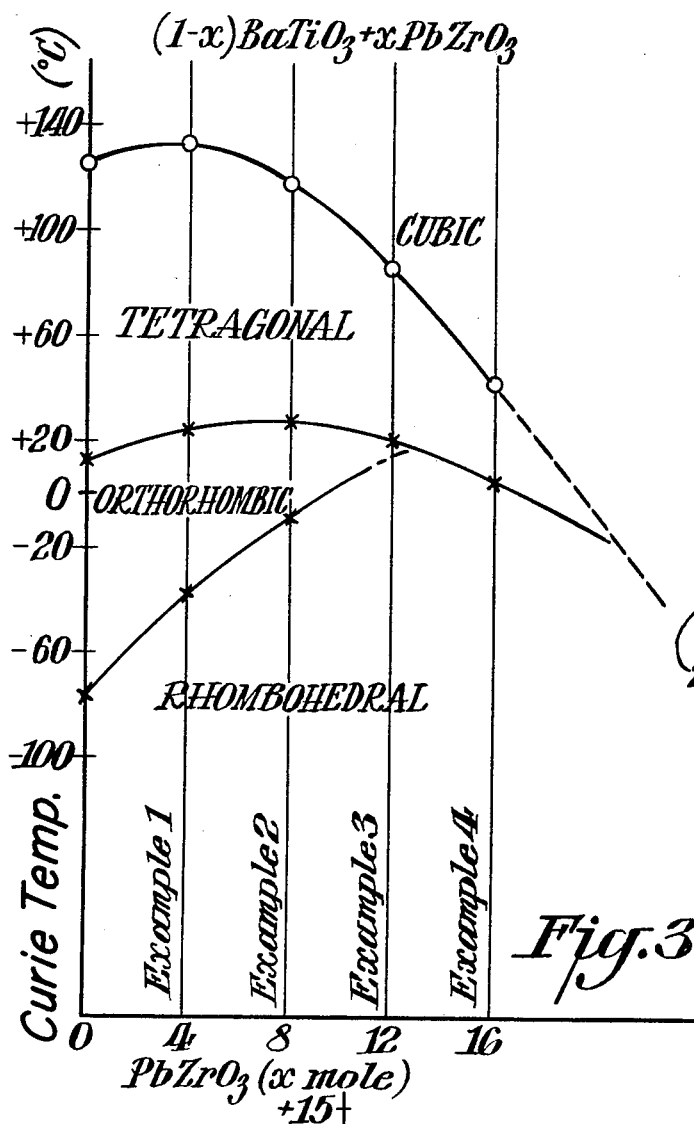
FIG. 3 shows, for barium-lead-titanate-zirconate compositions, the crystalline-form transition temperatures as a function of the lead-zirconate content.

The capacitors of Examples 1, 2, 3 and 4 have a dielectric consisting of barium titanate and lead zirconate without additives. The effect on crystal transition temperatures of changing the molar amount of lead zirconate in this composition from 0-16% is illustrated in FIG. 3. It can be seen from these curves that the three ferroelectric phases tend to merge and transform into the paraelectric (cubic) phase between 16-22 mole % lead zirconate. Of major interest for use in capacitors having broad TCC characteristics is the range of 8-15 mole % lead zirconate where at least two separate transition temperatures exist on either side of 23° C. (room temperature).

The ceramic bodies in Examples 1, 2, 3 and 4 contain no fluxes and it was necessary to fire at 1300° C. to achieve a good solid solution and absence of porosity. In the remaining examples, firing was at 1100° C. In Examples 5, 6, 7 and 8, four distinct cadmium silicate compounds were alternately mixed with a barium titanate lead zirconate wherein the cadmium content of the whole mixture was kept essentially constant. These cadmium silicate compounds are $CdO.SiO_2$, $2CdO.SiO_2$, $5CdO.2SiO_2$ and $3CdO.SiO_2$; which are abbreviated hereinafter as 1:1, 2:1, 5:2, and 3:1, respectively. These silicates were formed by the following procedure.

Fused-silica powder and cadmium oxide were milled in acetone for two hours to less than 5 microns particle size. The milled powder was then dried, granulated and sintered in two steps, namely at 780° C. for two hours and at 1050° C. for two hours in a closed crucible. All of these compounds are crystalline. None of them melts at a temperature less than 1200° C.

As the temperature is raised to form the 3:1 material, the 5:2 phase forms first. The 3:1 phase material required a higher temperature (1110° C.) to achieve complete reaction. Even in the case of forming the 2:1 phase, the 5:2 phase appears to form first at the lower temperatures along with a small amount of 1:1 phase.

Powder x-ray diffraction analysis showed that the lattice parameters and intensity diffraction peaks for the 2:1 and 3:1 cadmium silicate phases closely resemble those recorded by Glasser and Glasser in the paper entitled, "The Preparation and Crystal Data of the Cadmium Silicates $CdSiO_3$, $Cd_2SiO_4$ and $Cd_3SiO_6$" on pages 1228–1230 in Organic Chemistry, Vol. 3, No. 9, September 1964. The 5:2 phase, however, appears to be an intermediate lower temperature phase that has heretofore gone unnoticed. Upon sintering of a compacted 5:2 phase disk at 1100° C. it was found to dissociate into equal amounts of 3:1 and 2:1 phases as subsequently determined by x-ray diffraction and microprobe analysis. The crystal structure of the 5:2 phase is similar to that of the 3:1 phase but with slightly smaller lattice constants. The color of the cadmium silicate powders, 3:1, 5:2, 2:1 and 1:1 is light brown, pale yellow, ivory, and off-white, respectively.

For determining their comparative reactivities and electrical properties, each of these powders was combined in Examples 5, 6, 7 and 8, respectively, with the mixture of high firing ceramic materials consisting (by weight percent) of 50 $BaTiO_3$, 21.5 $(Ba_{0.49}Ti_{0.46}Nb_{0.047})O_3$, 12 $BaZrO_3$ and 13 $PbTiO_3$ and disc capacitors were made. In each of the Examples 5 through 8, 3.5 wt % cadmium silicate was used. It can be seen from Table I that the capacitors of Example 7 exhibited the largest grains and the highest dielectric constant although all of these silicate compounds excepting the low cadmium fluxed material of Example 5 leads to large grains and high dielectric constants. Other properties are indicated in the tables by letters symbols having the following meanings:

(a) porous
(b) little solid solution, smooth TCC
(c) CdO precipitation
(d) TCC within X5U ($-56\%K_o < K < +22\%K_o$ from $-55°$ C. to $+85°$ C.)
(e) TCC within X7U ($-56\%K_o < K < +22\%K_o$ from $-55°$ C. to $+125°$ C.)
(f) TCC within Y5U ($-56\%K_o < K < +22\%K_o$ from $-30°$ C. to $+85°$ C.)
(g) TCC within X7S ($K = \pm 22\%K_o$ from $-55°$ C. to $+125°$ C.)
(h) TCC within X5S ($K = \pm 22\%K_o$ from $-55°$ C. to $+85°$ C.)

In Examples 9 through 17 the effect of varying the amount of cadmium silicate in a barium-lead-titanate-zirconate is shown. Amounts of $5CdO.2SiO_2$ from zero to 6 weight percent are represented, corresponding to atomic ratios of glass former to all cations ranging from zero to 1.9. In Examples 10 and 13, 4 weight percent of the silicate is used (leading to the atomic glass-former ratio aforementioned of 1.3). These two Examples exhibit large grains and high K but their significant differences, including disparate Curie temperatures, is attributable to the use of slightly different amounts of lead zirconate. In these and others of the Examples, optimum sintering and highest K are not realized for the same amount of lead, but in the context of the aforementioned effect of lead content on smoothness of the TCC characteristic and with reference to FIG. 3, the best combinations of high K and smooth TCC will occur from 9 to 13 atomic percent Pb of Pb+Ba. Over the broader range of from about 8 to 15 atomic percent Pb of Pb+Ba, good quality capacitors are also realized.

The foregoing examples illustrate the combination of $BaTiO_3$ and $PbZrO_3$ or their equivalents, as start materials, to form $(Ba_{1-x}Pb_x T_{i1-y}Zr_y)O_3$, where x lies in the range from 0.08 to 0.15 and is substantially equal to y. The quantities x and y should be essentially the same, namely within about 5% of each other.

In Example 18, no niobium was included, whereas the others of the foregoing examples include niobium. The capacitors of Example 18 failed to achieve substantial solid solution at the 1100° C. firing temperature. The TCC curve was very smooth, almost meeting the X7R standard of the Electronic Industries Association (EIA), i.e. variation of capacitance from that at room temperature is no greater than 15% over the temperature range of −55° C. to 125° C. The dielectric constant is over 3000 which is higher than for any other known medium temperature firing X7R materials. However, there was some cadmium oxide precipitation causing insulation resistance to be low. Some of the lead and some of the barium are believed to have displaced a quantity of cadmium in the flux materials. It appears that cadmium will only enter the barium titanate grains as a large cation of charge +1, and thus as an acceptor ion, as is further described by I. Burn in a patent application Ser. No. 079,685, filed simultaneously herewith on Sept. 28, 1979 that is assigned to the same assignee as is the present invention. The I. Burn patent application is incorporated by reference herein to further clarify the existence of $Cd^{+1}$ in barium titanate grains and the implications for achieving charge balance. All of this displaced cadmium in Example 18 was not welcome in the vacated large cation sites in the grains because the resulting disparity in charge balance would have been too great. The excess cadmium precipitated (as a cadmium oxide).

In the above described examples, niobium is included in the start materials as a barium titanate niobate. Examples 19 through 23 show the results from having added increasing amounts of niobium in the form $BaNb_2O_6$. The performance is about optimum in Example 21, the amount of niobium being approximately the same as that used in Example 12 wherein the niobium was introduced as having been calcined with barium titanate. Performance in Examples 12 and 21 is nearly the same. In Examples 26, niobium is introduced in yet a third form, namely as $Nb_2O_5$. Not as much niobium can be taken into the grains when introduced as niobia as opposed to having been precalcined with barium titanate (e.g. Example 12) or introduced as a niobate (e.g. Example 21). Too much niobium in the start materials leads to porosity, as is apparent from the data in Table II.

Examples 24 and 25 include ceramic materials having no lead. Reactivity was not as good and sintering and densification was not as readily achieved as for similar materials containing lead. However, it can be seen from this data that the barium-calcium-titanate-zirconates of Examples 24 and 25 provide excellent high K capacitor dielectrics.

Figure 4:
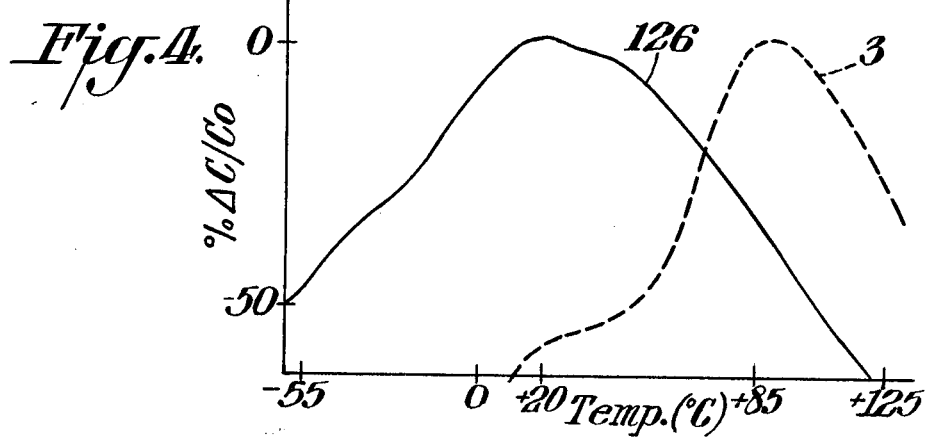
FIG. 4 shows a plot of the percent change in capacity (% Δ C), referenced to the room temperature capacity (Co) for ceramic capacitors of this invention.

The curve 3 in FIG. 4 indicates the change in capacitance (and dielectric constant) as a function of operating temperature for the capacitors of Example 3, wherein no cadmium and no niobium are present. Both contain lead zirconate. Curve 126 in FIG. 4 corresponds to the % Δ C/Co for the capacitors of Example 26 wherein both cadmium and niobium are included in the start materials. A remarkable difference is noticed between these two curves, namely that not only just the usual mild broadening of the TCC characteristic occurs, but an unexpected degree of smoothing is observed. And at the same time the peak dielectric constant in Example 26 (K=6100@21° C.) is greater than for Example 3 (K=4700@ Curie temperature 87° C.). It has been axiomatic that any additive to a ceramic material that will smooth its TCC characteristic, will also reduce the peak dielectric constant. Ceramic compositions of this invention tend to violate that axiom and they exhibit at once an unusually smooth TCC and a high dielectric constant. This is true for materials having a range of TCC characteristics within the X7R to Z5U standard limits.

The material of Example 26 is well within the E. I. A. standard X5U, i.e. capacity does not vary from its room temperature value more than 56% from −55° C. to +85° C. Medium firing materials with such a high dielectric constant exhibiting X5U characteristics have not been known heretofore. Refer to FIG. 4 and to Table III.

It has been noted that the combination of a very smooth (X7R) characteristic in the case of materials of Example 18 was accompanied by a surprisingly high K but also by precipitated cadmium that ruined the capacitor. The capacitors of Examples 27, 28 and 29 demonstrate that the same combination of high K and almost X7R smoothness can be accomplished along with high insulation resistance, by the addition of small quadravalent cations (e.g. $Ti^{+4}$ and $Zr^{+4}$). An addition of niobium ($Nb^{+5}$) was also noted to accomplish the same result in Example 23. Thus, both small quadravalent and pentavalent cations are effective in preventing precipitation of the cadmium.

However, when it is desired to make an X5U type material as in Example 26, it is necessary to promote the growth of large grains during firing. This is accomplished by insuring large-small cation stoichiometry as well as achieving charge balance in the grains. Thus, to achieve charge balance, for every large cadmium atom ($Cd^{+1}$) entering the grains, there should be one donor cation such as a small cation of charge +5 (e.g. $Nb^{+5}$) or a large cation of charge +3 (e.g. $La^{+3}$). Alternatively, a small cation of charge +6 ($W^{+6}$) will charge compensate two cadmium cations in the grain. The silicon remains in the grain boundaries keeping about an equal number or a greater number of cadmium atoms with it. The remaining cadmium is either substantially charge balanced in the grain or precipitates as cadmium metal, as has been noted. When charge balance is also effected, grain growth is promoted.

Monolithic ceramic capacitors were made, Example 30, that met the X5U standard and have a dielectric constant at room temperature of 8300. The DF is 2.1% at 1 volt r.m.s. and insulation resistance is 80,000 megohm-microfarads.

The start materials of Example 31 include separately powders of CdO and $SiO_2$ in the molar ratio of 5:2. The start materials in Example 32 are the same except the 5CdO.2SiO$_2$ cadmium silicate is substituted for the separate flux powders of Example 31. The greatly superior dielectric properties that are exhibited by the ceramic bodies of Example 32 are seen in Table III.

Various donors, in various amounts, are used in Examples 32 to 38 to achieve some degree of grain growth. When grain growth is so promoted, all of the charge balancing donor ions available in the start material go into the grains as determined by scanning electron microprobe. However, it has been found that when more donor cations than about 3 mole percent (of all cations) are available in the start material, then there is no grain growth. Beyond that amount the bodies tend to be porous, and of no practical use as dielectric materials. For the most efficient promotion of grain growth, it has been found that there should be approximately 1 mole percent cadmium (of all the cations) in the grains and a corresponding amount of donor cations in the grains to provide charge balance, e.g. 1 mole percent of $Nb^{+5}$, $Sb^{+5}$, $Ta^{+5}$, $La^{+3}$ or of $U^{+3}$, or alternatively 0.5 mole percent $W^{+6}$.

However, bismuth is a special case. Experimental evidence suggests that bismuth enters the grains as a small cation $Bi^{+5}$ up to one mole percent and after that enters the grain as a large cation $Bi^{+3}$. In either case it behaves as a donor. Thus up to 1 mole percent causes the Curie temperature of barium titanate to increase, and from about 1 to more than 1.6 mole percent bismuth in the grains causes the Curie temperature to decrease.

In the latter range a strong reduction in Curie temperature occurs, the 1.8 mole percent Bi in the material of Example 34 having depressed the Curie temperature to less than 0° C.

Thus, in the large grain capacitor bodies of this invention, the cadmium replaces Ba and Pb at firing in the amounts of from 0.4 to 3 mole percent and donors enter the grains in corresponding charge compensating amounts of from 0.2 to 3 mole percent.

Referring to Table IV, the capacitors of Examples 39 and 40 are monolithic ceramic capacitors having the same body compositions and same structures. The capacitors of each group have 12 active dielectric layers. The capacitors of Example 39 were fired at 1100° C. for 2½ hours in a closed crucible as were the capacitors of the Examples 1 through 38. The capacitors of Example 40 were fired at 1100° C. for 2½ hours on an open slab. Except that the Curie temperature of the slab fired capacitors was higher, there was no substantial difference in electrical characteristic between open fired and closed fired units.

TABLE I

| Ex. | BaTiO$_3$ | | | PbZrO$_3$ | | | Cadmium Silicate | K at 23° C. or at T$_c$ | Grain size (microns) (μ) | Curie Temp. T$_c$ (°C.) | % G | Pb/ Pb + Ba | Notes |
|---|---|---|---|---|---|---|---|---|---|---|---|---|---|
| | | | | | | | BY WEIGHT | | | | | | |
| 1 | 94.17 | | | 5.83 | | | | 6700(T$_c$) | >7 | +130 | 0 | .038 | |
| 2 | 88.56 | | | 11.44 | | | 0 | 6200(T$_c$) | >7 | +119 | 0 | .083 | |
| 3 | 83.16 | | | 16.84 | | | 0 | 4700(T$_c$) | >7 | +87 | 0 | .120 | |
| 4 | 77.95 | | | 22.05 | | | 0 | 5000(T$_c$) | >7 | +40 | 0 | .160 | |
| | BaTiO$_3$ | *BaTiO$_3$(+Nb$_2$O$_5$) | | PbTiO$_3$ | | BaZrO$_3$ | | | | | | | |
| 5 | 50.0 | 21.5 | (0.98) | 13.0 | | 12.0 | 3.5(1:1) | 3400 | <1 | Broad | 2.3 | .11 | (a) |
| 6 | 50.0 | 21.5 | (0.98) | 13.0 | | 12.0 | 3.5(2:1) | 6100 | 1-3 | +13 | 1.4 | .11 | (d) |
| 7 | 50.0 | 21.5 | (0.98) | 13.0 | | 12.0 | 3.5(5:2) | 6600 | 3-6 | +8 | 1.1 | .11 | (d) |
| 8 | 50.0 | 21.5 | (0.98) | 13.0 | | 12.0 | 3.5(3:1) | 5600 | 2-5 | +8 | 1.0 | .11 | (d) |
| | BaTiO$_3$ | Ba$_{.49}$Ti$_{.46}$Nb$_{.047}$O$_3$ | | PbZrO$_3$ | | | Cadmium Silicate | | | | | | |
| 9 | 60.55 | 25.95(1.42Nb$_2$O$_5$) | | 13.5 | | | 0 | 2300 | <1 | Broad | 0 | .10 | (b) |
| 10 | 58.80 | 25.20(1.35Nb$_2$O$_5$) | | 14.0 | | | 2.0(5:2) | 6400 | ≈1 | +34 | 0.6 | .10 | (a) |
| 11 | 58.45 | 25.05(1.37Nb$_2$O$_5$) | | 13.5 | | | 3.0(5:2) | 6700 | 3-5 | +26 | 1.0 | .10 | (d) |
| 12 | 58.10 | 24.90(1.36Nb$_2$O$_5$) | | 13.0 | | | 4.0(5:2) | 6700 | 3-5 | +15 | 1.3 | .10 | (d) |
| 13 | 58.80 | 25.20(1.37Nb$_2$O$_5$) | | 12.0 | | | 4.0(5:2) | 6400 | 5-8 | +32 | 1.3 | .09 | (d) |
| 14 | 57.40 | 24.60(1.35Nb$_2$O$_5$) | | 12.0 | | | 6.0(5:2) | 5300 | 2-5 | +18 | 1.9 | .09 | (e) |

*calcined with 5.47 wt % Nb$_2$O$_5$,

TABLE II

| Ex. | BaTiO$_3$ | PbTiO$_3$ | BaZrO$_3$ | Nb$_2$O$_5$ | 5CdO. 2SiO$_2$ | K | Grain Size (μ) | Curie Temp. (°C.) | % G | Pb/ Pb + Ba | Notes |
|---|---|---|---|---|---|---|---|---|---|---|---|
| | | | | | BY WEIGHT | | | | | | |
| 15 | 69.5 | 13.34 | 12.17 | 1.0 | 4.0 | 6600 | 2-5 | +18 | 1.3 | 0.11 | (d) |
| 16 | 67.4 | 14.44 | 13.17 | 1.0 | 4.0 | 5000 | 2-5 | +6 | 1.3 | 0.12 | (d) |
| 17 | 65.3 | 15.43 | 14.17 | 1.0 | 4.0 | 4900 | 2-5 | −4 | 1.3 | 0.13 | (d) |
| | | PbZrO$_3$ | BaNb$_2$O$_5$ | | | | | | | | |
| 18 | 82.0 | 14.0 | 0 | | 4.0 | 3400 | <1 | Broad | 1.3 | 0.10 | (c) |
| 19 | 81.10 | 13.5 | 1.42 | | 4.0 | 4630 | 1-3 | +51 | 1.3 | 0.10 | (d) |
| 20 | 81.0 | 13.5 | 1.74 | | 4.0 | 6860 | 2-6 | +35 | 1.3 | 0.10 | (d) |
| 21 | 80.4 | 13.5 | 2.10 | | 4.0 | 6600 | 3-6 | +20 | 1.3 | 0.10 | (d) |
| 22 | 79.7 | 13.5 | 2.84 | | 4.0 | 4550 | ≈1 | −7.0 | 1.3 | 0.10 | |
| 23 | 78.2 | 13.5 | 4.26 | | 4.0 | 2800 | <1 | Very Broad | 1.3 | 0.10 | (a) |
| | BaTiO$_3$ | CaZrO$_3$ | *BaTiO$_3$(+Nb$_2$O$_5$) | | 5CdO. 2SiO$_2$ | | | | | | |
| 24 | 61.85 | 6.0 | 26.0 | (1.42) | 7.0 | 4700 | 2-5 | +15 | 2.1 | 0.00 | (f) |
| 25 | 61.60 | 6.0 | 26.4 | (1.44) | 6.0 | 4200 | 1-3 | +20 | 1.8 | 0.00 | (f) |

*calcined with 5.47 wt % Nb$_2$O$_5$,

TABLE III

| Ex. | BaTiO$_3$ | *BaTiO$_3$(+Nb$_2$O$_5$) | PbZrO$_3$ | Nb$_2$O$_5$ | TiO$_2$ | ZrO$_2$ | 5CdO.2SiO$_2$ | K | Grain Size ($\mu$) | Curie Temp. (°C.) | % G | Pb/Pb+Ba | Notes |
|---|---|---|---|---|---|---|---|---|---|---|---|---|---|
| | | | BY WEIGHT | | | | | | | | | | |
| 26 | 79.5 | | 15.5 | | 1.0 | | 4.0 | 6100 | 3–7 | +21 | 1.3 | 0.12 | (d) |
| 27 | 82.1 | | 13.5 | | .400 | | 4.0 | 2800 | <1 | Broad | 1.3 | 0.10 | (g) |
| 28 | 81.9 | | 13.5 | | .600 | | 4.0 | 2800 | <1 | Broad | 1.3 | 0.10 | (g) |
| 29 | 81.6 | | 13.5 | | | .924 | 4.0 | 2950 | <1 | Broad | 1.3 | 0.10 | (g) |
| 30 | 57.4 | 24.6 | (1.34) | 15.00 | | | 3.0 | 8300 | 4–8 | +12 | 1.0 | 0.11 | (d) |

| Ex. | BaTiO$_3$ | PbZrO$_3$ | Nb$_2$O$_5$ | Sb$_2$O$_5$ | Bi$_2$O$_3$ | WO$_3$ | La$_2$TiO$_7$ | U$_3$O$_8$ | 5CdO.2SiO$_2$ | K | Grain Size ($\mu$) | Curie Temp. (°C.) | % G | Pb/Pb+Ba | Notes |
|---|---|---|---|---|---|---|---|---|---|---|---|---|---|---|---|
| | | | | DONORS | | | | | | | | | | | |
| | | | | BY WEIGHT | | | | | | | | | | | |
| 31 | 79.5 | 15.5 | 1.00 | | | | | | 3.38 CdO + 0.62SiO$_2$ | 4970 | ≈1 | +50 | 1.3 | 0.12 | (c) |
| 32 | 79.5 | 15.5 | 1.00 | | | | | | 3.5 | 7170 | 3–7 | +21 | 1.3 | 0.12 | (e) |
| 33 | 82.5 | 14.0 | | 1.21 | | | | | 3.5 | 5400 | 4–8 | +25 | 1.1 | 0.10 | |
| 34 | 82.5 +0.6TiO$_2$ | 14.00 | | | 3.50 | | | | 3.5 | 2700 | 2–5 | ≈−5 | 1.1 | 0.10 | |
| 35 | 82.0 | 14.0 | | | | 0.93 | | | 4.0 | 6700 | 2–8 | +28 | 1.3 | 0.10 | (d) |
| 35× | 78.5 | 18.0 | | | | 0.93 | | | 3.5 | 4400 | | −25 | 1.1 | 0.13 | (e) |
| 36 | 80.9 | 13.6 | | | | | 1.91 | | 3.5 | 5500 | 3–8 | +58 | 1.1 | 0.10 | (d) |
| 37 | 80.0 | 13.6 | | | | | 2.87 | | 3.5 | 4100 | 0.5–1 | Broad | 1.1 | 0.10 | (g) |
| 38 | 82.5 | 14.0 | | | | | | 0.6 | 3.5 | 2800 | <1 | Broad | 1.1 | 0.10 | (g) |

*calcined with 5.47 wt % Nb$_2$O$_5$

TABLE IV

| Ex. | BaTiO$_3$ | *BaTiO$_3$(+Nb$_2$O$_5$) | PbZrO$_3$ | 5CdO.2SiO$_2$ | K | Grain Size ($\mu$) | Curie Temp. (°C.) | % G | Pb/Pb+Ba | Notes |
|---|---|---|---|---|---|---|---|---|---|---|
| | | BY WEIGHT | | | | | | | | |
| 39 | 57.4 | 24.6 | (1.34) | 14.00 | 4.0 | 6800 | 4–8 | +20 | 1.2 | 0.10 | (f) |
| 40 | 57.4 | 24.6 | (1.34) | 14.00 | 4.0 | 6800 | 4–8 | +39 | 1.2 | 0.10 | (e) |

*calcined with 5.47 wt % Nb$_2$O$_5$

What is claimed is:

1. A method for making a ceramic capacitor comprising:
   mixing ceramic precursor powders consisting essentially of a high-temperature-firing ceramic that includes an alkaline-earth-metal titanate and a cadmium silicate powder selected from CdO.SiO$_2$, 2CdO.SiO$_2$, 5CdO.2SiO$_2$, 3CdO.SiO$_2$ and combinations thereof, the overall atomic ratio of Cd to Si in said cadmium silicate powder being from 2:1 to 3:1,
   forming a body of said mixed powders;
   firing said body at a temperature of up to 1150° C. and at less than the melting temperature of said cadmium silicate powder; and
   applying two spaced electrodes in contact with said body.

2. The method of claim 1 wherein said high temperature firing ceramic is a barium-lead-titanate.

3. The method of claim 2 wherein the source of said lead in said precursor powders is a compound selected from lead zirconate, lead stannate, lead titanate and mixtures thereof.

4. The method of claim 2 wherein said high temperature firing ceramic is a barium-lead-titanate-zirconate, the number of lead cations being within 5% of the number of zirconium cations.

5. The method of claim 2 where said lead amounts to as much as 15 mole percent of the sum of said lead and said alkaline-earth metal.

6. The method of claim 1 wherein at least 90% by weight of said high temperature firing ceramic has essentially the formula (BaTiO$_3$)$_{1-x}$.(PbZrO$_3$)$_x$ where x has a value in the range from 0.08 to 0.15.

7. The method of claim 1 wherein said precursor powders include barium-titanate-donor atoms selected from bismuth, niobium, tantalum, antimony, tungsten, lanthanum, uranium and combinations thereof, in a molar amount no greater than that of said cadmium.

8. The method of claim 7 wherein said precursor powders include a prereacted barium titanate niobate.

9. The method of claim 1 wherein the number of atoms of said silicon is no more than 2.2% of the total number of cations in said precursor material.

10. The method of claim 1 wherein said cadmium silicate is 5CdO.2SiO$_2$.

11. A ceramic capacitor comprising a dielectric ceramic body and two spaced electrodes in contact with said body, said body consisting essentially of a granular crystalline phase and an intergranular silicate phase, said granular phase consisting essentially of from 92 to 84 mole percent BaTiO$_3$ and from 8 to 15 mole percent PbZrO$_3$ wherein from 0.4 to 3 mole percent of said Ba and Pb are replaced by cadmium cations, the atomic ratio of the total number of Cd atoms to the total number of Si atoms in said body being from 2:1 to 3:1.

12. The ceramic capacitor of claim 11 wherein said cadmium cations are +1 charge and from 0.2 to 3 mole percent donor cations selected from Nb$^{+5}$, Ta$^{+5}$, Sb$^{+5}$, Bi$^{+5}$, Bi$^{+3}$, La$^{+3}$, U$^{+3}$, W$^{+6}$, and combinations thereof to substantially charge balance said Cd$^{+1}$ cations.

13. The ceramic capacitor of claim 11 wherein said total number of Si atoms is in said intergranular silicate and amounts to from 0.5 to 2.2 mole percent of the total number of cations in said ceramic body.

14. A ceramic capacitor comprising a dielectric ceramic body and two spaced electrodes in contact with said body, said body consisting essentially of a granular crystalline phase and an intergranular silicate phase, said granular phase consisting essentially of from 92 to 84 mole percent $BaTiO_3$ and from 8 to 15 mole percent $PbZrO_3$ wherein from 0.4 to 3 mole percent of said Ba and Pb are replaced by cadmium cations, the atomic ratio of the total number of Cd atoms to the total number of Si atoms in said body being from 2.1 to 3:1, said body having been formed from a mixture of a high-temperature-firing ceramic powder and a cadmium silicate powder selected from $CdO.SiO_2$, $2CdO.SiO_2$, $5CdO.2SiO_2$, $3CdO.SiO_2$ and combinations thereof and said body having been fired at a temperature less than the melting temperature of said cadmium silicate.

* * * * *

UNITED STATES PATENT OFFICE
CERTIFICATE OF CORRECTION

Patent No. 4,266,265     Dated May 5, 1981

Inventor(s)   Galeb H. Maher

It is certified that error appears in the above-identified patent and that said Letters Patent are hereby corrected as shown below:

Column 5, line 14, "$(Ba_{1-x}Pb_x\ Ti_{1-y}Zr_y)O_3$" should read -- $(Ba_{1-x}Pb_xTi_{1-y}Zr_y)O_3$ --

Column 5, line 52, "optimumin" should read -- optimum in --

Column 5, line 62, "materialsleads" should read -- materials leads --

Columns 9 and 10, TABLE III, under DONORS, "$La_2TiO_7$" should read -- $La_2Ti_2O_7$ --

Claim 14, line 10 (Column 12, line 2) "2.1" should read -- 2:1 --

Signed and Sealed this

Twenty-first Day of July 1981

[SEAL]

Attest:

GERALD J. MOSSINGHOFF

Attesting Officer     Commissioner of Patents and Trademarks